(12) United States Patent
Boehme et al.

(10) Patent No.: US 10,802,154 B2
(45) Date of Patent: Oct. 13, 2020

(54) APPARATUS FOR TRANSLATION OF GPS SIGNALS TO FACILITATE ASSET TRACKING

(71) Applicant: The Johns Hopkins University, Baltimore, MD (US)

(72) Inventors: Michael H. Boehme, Rehoboth Beach, DE (US); Richard B. Baker, Mount Airy, MD (US); Wade F. Freeman, Point of Rocks, MD (US); Michael R. LoPresti, Silver Spring, MD (US); Kenneth W. Harclerode, Pasadena, MD (US)

(73) Assignee: The Johns Hopkins University, Baltimore, MD (US)

( * ) Notice: Subject to any disclaimer, the term of this patent is extended or adjusted under 35 U.S.C. 154(b) by 366 days.

(21) Appl. No.: 15/837,154

(22) Filed: Dec. 11, 2017

(65) Prior Publication Data

US 2018/0231665 A1 Aug. 16, 2018

Related U.S. Application Data

(60) Provisional application No. 62/459,627, filed on Feb. 16, 2017.

(51) Int. Cl.
*G01S 19/18* (2010.01)
*G01S 19/26* (2010.01)
(Continued)

(52) U.S. Cl.
CPC ............ *G01S 19/18* (2013.01); *F41G 7/2286* (2013.01); *F42B 15/12* (2013.01); *G01S 19/26* (2013.01);
(Continued)

(58) Field of Classification Search
CPC .......... G01S 19/18; G01S 19/26; G01S 19/28; F41G 7/2286; F41G 7/006; F41G 7/346; F42B 15/12
(Continued)

(56) References Cited

U.S. PATENT DOCUMENTS 5,594,454 A * 1/1997 Devereux ................ G01S 19/18
  342/357.395
6,163,210 A * 12/2000 Fukuchi ................ H03F 1/3229
  330/151

(Continued)

OTHER PUBLICATIONS

Michael H. Boehme, "Miniature Analog GPS Translator for Trident Reentry Body Accuracy Analysis," Johns Hopkins APL Technical Digest, vol. 29, No. 2 (2010), pp. 133-140.

*Primary Examiner* — Vladimir Magloire
*Assistant Examiner* — Nuzhat Pervin
(74) *Attorney, Agent, or Firm* — Noah J. Hayward

(57) ABSTRACT

A method for facilitating real time tracking of an airborne asset via downlink of GPS signals that are usable for determining asset location information from the asset to a ground station may include receiving a first GPS signal and a second GPS signal at a device disposed on the airborne asset and combining the first and second GPS signals to form combined signal responsive to filtration and amplification of the first and second GPS signals. The method may further include employing an overlay analog translation to convert the combined signal into a composite signal at a different frequency than the combined signal, generating a pilot carrier frequency for association with the composite signal, and amplifying the composite signal prior to transmission via the downlink from the airborne asset to the ground station. The pilot carrier frequency and amplitude may be adjustable.

20 Claims, 4 Drawing Sheets

(51) Int. Cl.
  *G01S 19/28* (2010.01)
  *F41G 7/22* (2006.01)
  *F42B 15/12* (2006.01)
  *F41G 7/34* (2006.01)
  *F41G 7/00* (2006.01)

(52) U.S. Cl.
  CPC .............. *G01S 19/28* (2013.01); *F41G 7/006* (2013.01); *F41G 7/346* (2013.01)

(58) Field of Classification Search
  USPC ......................................................... 342/62
  See application file for complete search history.

(56) References Cited

U.S. PATENT DOCUMENTS

| | | | | |
|---|---|---|---|---|
| 6,525,603 | B1* | 2/2003 | Morgan | H03F 1/3235 330/151 |
| 6,795,508 | B1* | 9/2004 | Odenwalder | H04B 7/0604 375/267 |
| 7,848,443 | B2* | 12/2010 | Pirak | H04W 52/367 375/267 |
| 8,068,984 | B2* | 11/2011 | Smith | G01S 19/47 701/472 |
| 8,767,615 | B2* | 7/2014 | Chang | H04J 14/02 370/316 |
| 9,097,783 | B2* | 8/2015 | Mathews | H04B 1/709 |
| 9,455,762 | B2* | 9/2016 | Mathews | G01S 19/11 |
| 9,621,254 | B2* | 4/2017 | Chang | H04W 4/90 |
| 2005/0111383 | A1* | 5/2005 | Grob | H04W 52/06 370/254 |
| 2005/0174235 | A1* | 8/2005 | Davis | G08B 21/0269 340/539.13 |
| 2006/0035676 | A1* | 2/2006 | Sayers | H04L 63/0853 455/562.1 |
| 2006/0066484 | A1* | 3/2006 | Sayers | H04B 7/0686 342/432 |
| 2006/0071794 | A1* | 4/2006 | Sayers | H01Q 1/246 340/572.7 |
| 2007/0161347 | A1* | 7/2007 | Ma | H04B 7/18506 455/11.1 |
| 2007/0257831 | A1* | 11/2007 | Mathews | G01S 5/0289 342/22 |
| 2008/0088507 | A1* | 4/2008 | Smith | G01C 21/165 342/386 |
| 2008/0091350 | A1* | 4/2008 | Smith | G01C 21/165 701/472 |
| 2008/0094214 | A1* | 4/2008 | Azevedo | G08B 13/2457 340/568.1 |
| 2008/0224854 | A1* | 9/2008 | Furey | G08B 21/0269 340/539.13 |
| 2009/0002213 | A1* | 1/2009 | LaMarche | G01R 23/16 341/155 |
| 2009/0224892 | A1* | 9/2009 | Nicholls | G01S 13/878 340/10.42 |
| 2009/0256750 | A1* | 10/2009 | Mathews | G01S 5/0289 342/450 |
| 2010/0103046 | A1* | 4/2010 | Smith | G01C 21/165 342/386 |
| 2010/0103980 | A1* | 4/2010 | Smith | G01S 1/042 375/131 |
| 2010/0103982 | A1* | 4/2010 | Smith | G01S 5/0263 375/135 |
| 2010/0103989 | A1* | 4/2010 | Smith | G01S 5/0263 375/150 |
| 2011/0234454 | A1* | 9/2011 | Mathews | G01S 19/11 342/357.25 |
| 2012/0029818 | A1* | 2/2012 | Smith | G01S 1/24 701/468 |
| 2012/0032842 | A1* | 2/2012 | Smith | G01S 1/24 342/357.29 |
| 2012/0140780 | A1* | 6/2012 | Chang | H04J 14/08 370/479 |
| 2012/0169542 | A1* | 7/2012 | Mathews | H04B 1/709 342/450 |
| 2012/0301136 | A1* | 11/2012 | Chang | H04B 7/0413 398/16 |
| 2013/0070677 | A1* | 3/2013 | Chang | H04B 7/18517 370/328 |
| 2014/0062781 | A1* | 3/2014 | Mathews | G01S 19/246 342/357.64 |
| 2014/0161025 | A1* | 6/2014 | Chang | H04B 7/18517 370/316 |
| 2014/0241239 | A1* | 8/2014 | Chang | H04B 7/18504 370/316 |
| 2014/0286235 | A1* | 9/2014 | Chang | H04J 14/005 370/316 |
| 2015/0303989 | A1* | 10/2015 | Mathews | H04B 1/709 375/148 |
| 2016/0014786 | A1* | 1/2016 | Chang | H04N 21/6143 370/316 |
| 2016/0033649 | A1* | 2/2016 | Mathews | H04B 7/18513 342/357.48 |
| 2018/0175932 | A1* | 6/2018 | Lucky | H04B 7/18543 |
| 2018/0239024 | A1* | 8/2018 | Brand | G01S 19/14 |

* cited by examiner

APPARATUS FOR TRANSLATION OF GPS SIGNALS TO FACILITATE ASSET TRACKING

CROSS-REFERENCE TO RELATED APPLICATIONS

This application claims priority to and the benefit of prior-filed, U.S. Provisional Application Ser. No. 62/459,627 filed on Feb. 16, 2017, the entire contents of which are hereby incorporated herein by reference.

STATEMENT OF GOVERNMENTAL INTEREST

This invention was made with Government support under contract number N00024-03-D-6606 awarded by the Naval Sea Systems Command (NAVSEA). The Government has certain rights in the invention.

TECHNICAL FIELD

Example embodiments generally relate to techniques and devices for translating signals and, in particular, relate to an apparatus that can, in a small form factor, perform overlay analog translation of global positioning system (GPS) signals to enhance ground station tracking of assets.

BACKGROUND

Intercontinental ballistic missiles (ICBMs) are examples of assets that are often fired on test ranges that allow strict safety procedures to be adhered to with respect to the testing of the assets. Other missiles, warheads, aircraft or weapon systems may similarly be tested at ranges where the performance of such assets can be safely monitored while large amounts of data can be gathered for analysis. For each test range, and for each exercise performed, strict range safety protocols are defined and well understood by all participants.

In many cases, the testing that is being performed may require accurate tracking of the assets while they are in flight. Increased accuracy of data related to asset tracking in flight may allow increased accuracy for post flight evaluation. However, whether the performance of positioning or targeting systems on the assets are being evaluated or not, accurate position information for the assets is nevertheless important to be tracked on the ground to enable rapid identification of situations where asset performance becomes dangerous. For example, if the guidance system of a missile is malfunctioning or apparently inaccurate, the missile may be headed off the range. Even if the missile has no warhead onboard, the missile itself could be a danger to people and/or property if it leaves the range and crashes. Thus, accurate, real-time location information needs to be available to personnel on the ground so that conditions can be tracked at all times to monitor for situations where action needs to be taken to preserve range safety initiatives (e.g., missile detonation in flight, or input of steering or guidance instructions to correct course for the asset).

BRIEF SUMMARY OF SOME EXAMPLES

Some example embodiments may enable the provision of an apparatus that can provide analog translation of GPS signals to facilitate real time and accurate tracking of assets.

In one example embodiment, an apparatus configured to be disposed on an airborne asset to communicate GPS signals usable for determining location information of the asset to a ground station for tracking of the asset may be provided. The apparatus may include a dual input low noise amplifier, a translator module and a power amplifier. The low noise amplifier may be configured to receive a first GPS signal and a second GPS signal and combine the first and second GPS signals to form combined signal. The translator module may be configured to employ overlay analog translation to convert the combined signal into a composite signal at a different frequency than the combined signal. The power amplifier may be configured to amplify the composite signal prior to transmission via a downlink from the airborne asset to the ground station. The translator module may be configured to generate a pilot carrier frequency to facilitate ground station tracking of the airborne asset. The pilot carrier frequency is independently adjustable via a frequency programming module of the translator module.

In another example embodiment, a method for facilitating real time tracking of an airborne asset via downlink of GPS signals usable for determining location information from the asset to a ground station is provided. The method may include receiving a first GPS signal and a second GPS signal at a device disposed on the airborne asset and combining the first and second GPS signals to form combined signal responsive to filtration and amplification of the first and second GPS signals. The method may further include employing an overlay analog translation to convert the combined signal into a composite signal at a different frequency than the combined signal, generating a pilot carrier frequency for association with the composite signal, and amplifying the composite signal prior to transmission via the downlink from the airborne asset to the ground station. The pilot carrier frequency may be independently adjustable.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
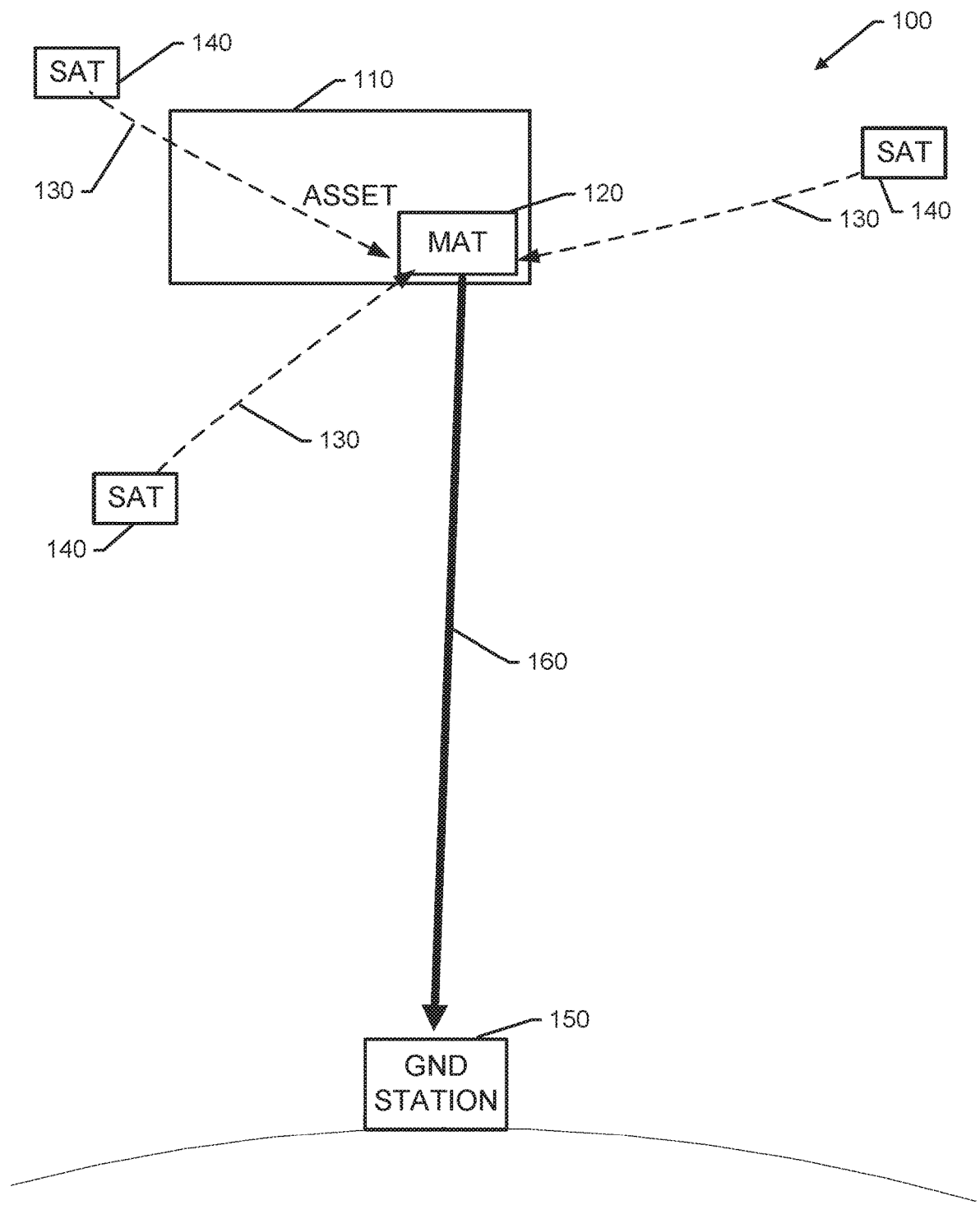
FIG. 1 illustrates a functional block diagram of a system that may be useful in connection with tracking asset location for an airborne asset according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, the term "asset" should be understood to correspond to a missile, airborne munition, warhead, aircraft, or other trackable airborne vehicle.

As indicated above, some example embodiments may relate to the provision of improved accuracy for real time tracking of assets on test ranges. However, it should be appreciated that example embodiments could also be employed in other environments (including live fire situations) where it may be beneficial to have accurate asset position information in real time. Example embodiments may be configured to not only facilitate real time asset tracking, but do so in a low power and relatively small form factor that ultimately means that there is less impact on the asset itself. The relatively small form factor is one reason why some example embodiments may be referred to as a Miniature Analog Translator (MAT). Example embodiments may also provide flexible programming options that enhance the ability of range personnel to make the MAT easier to integrate with other components or assets that may be operating on or near the range without interference as described in greater detail below.

FIG. 1 illustrates a conceptual block diagram of a system in which an example embodiment may operate. Referring now to FIG. 1, a system 100 in which an example embodiment may operate is shown. The system 100 may include an asset 110 on which an instance of the MAT 120 is located. The MAT 120 may receive GPS signals 130 from multiple GPS satellites 140 that are visible to the MAT 120. Of note, the asset 110 itself may also include a GPS receiver onboard, and the asset 110 may therefore compute its own location using the GPS receiver onboard. However, the MAT 120 may operate independent of the GPS receiver onboard the asset 110 (if such receiver exists).

The GPS signals 130 of some examples may include L-band signals such as GPS L1 C/A (coarse/acquisition) and P(Y) codes (i.e., anti-spoofing, encrypted signals), and GPS L2 P(Y) codes from the GPS satellites 140. The GPS signals 130 are, according to conventional GPS ranging techniques, received at the GPS receiver of a particular device (e.g., the asset 110) and processed to determine a precise location of the device relative to the GPS satellites 140. The timing associated with receipt of the signals is used to determine the precise location of the GPS receiver. Accordingly, the GPS signals 130 that are received and processed at the asset 110 would indicate an accurate location for the asset 110. As mentioned above, for range safety purposes, it may be desirable to know the precise location of the asset 110 at a control center on the ground. However, the same frequencies received cannot merely be relayed onward to the ground due to the potential for interference at the frequencies used by the GPS satellites 140. Thus, it may be desirable to translate the GPS signals 130 (i.e., L-band signals) received at the asset 110 to another frequency for transmission to a ground station 150.

Furthermore, it should be noted that the MAT 120 adds particular value when more GPS signals can be relayed than those that could be processed at the receiver of the asset 110. For example, if the asset only processes GPS L1 signals, then the asset 110 could calculate its location and send the location on to the ground station. However, if GPS L2 signals were also available, the accuracy of the location provided to the ground station could not be enhanced if the receiver only processed the L1 signals. In other words, The receiver is limited to receiving only as many GPS signals as it has channels. However, the MAT 120 relays all GPS signals (including the L2 signal and any others that may enhance accuracy and are in view). In addition, since the receiver of the asset 110 may be processing the GPS data including times where there were drop-outs or loss of lock thereby making some data permanently lost. However, the MAT 120, since it is relaying GPS data, is not prone to inaccuracies associated with processing drop-outs. Thus, a very valuable capability of the MAT 120 may be its post-flight analysis/fault detection and isolation capabilities in prototype/systems under development, especially high cost systems where each test flight is very expensive.

The MAT 120 may, due to its location on the asset 110, receive the same GPS signals 130 that would be received by any GPS receiver on the asset 110. As such, the GPS signals 130 received at the MAT 120 are indicative of the location of the asset 110. The MAT 120 is configured to translate the L-band signals (e.g., L1/L2) of the GPS signals 130 received at the MAT 120 into another frequency band (e.g., S-band) for transmission to the ground station 150 via a downlink transmission 160. In this regard, for example, the MAT 120 may be configured to perform an overlay analog wideband frequency translation using a dual heterodyne method to conduct the frequency translation. The ground station 150 may thereafter process the downlink transmission 160 to enable the ground station 150 to determine (and track) the location of the asset 110 in real time.

In some cases, the system 100 may have a number of other components and/or devices either communicating within the system 100, or communicating in the vicinity of the system 100. Thus, the airspace in which the asset 110 operates may have any number of radio frequency (RF) emitters therein. In some cases, management of the emitters to avoid conflicts and interference may be an important task for range personnel to handle. If certain emitters are not flexible in terms of the frequencies at which they operate, the management task may become increasingly more complex. Accordingly, the MAT 120 may be designed to allow significant flexibility in the programming of frequencies used for the translation and for the provision of a pilot signal that will assist the ground station 150 in tracking the asset 110.

Figure 2:
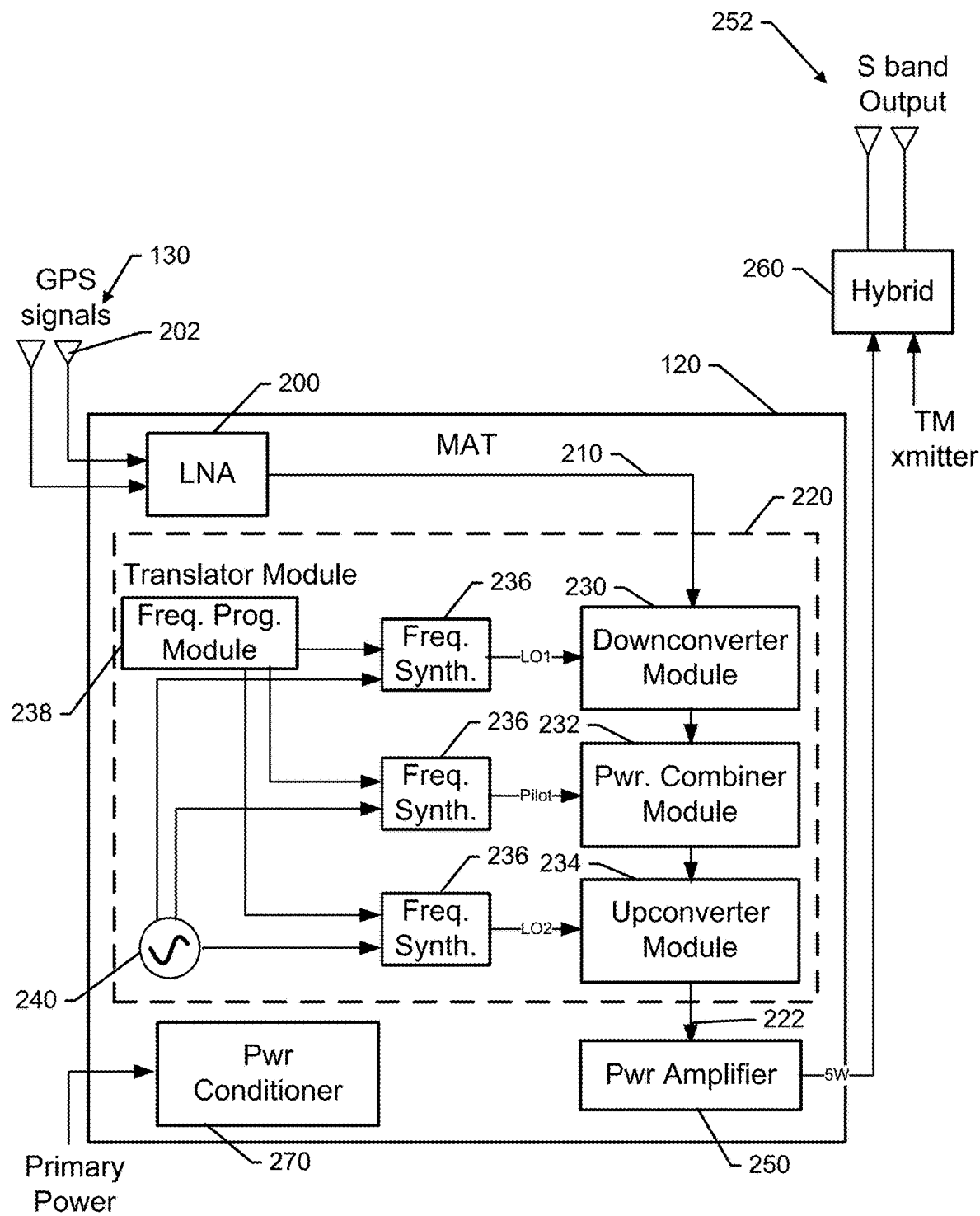
FIG. 2 illustrates a functional block diagram of an apparatus that may be useful in connection with performing a translation of GPS signals usable for determining asset location information for downlink transmission of the translated GPS signals to a ground station according to an example embodiment.

FIG. 2 is a block diagram of a structure that may be employed for implementing the MAT 120 in accordance with an example embodiment. As shown in FIG. 2, the MAT 120 may include a dual input low noise amplifier (LNA) 200 to receive the GPS signals 130. Receive antennas 202 may be disposed at a portion of the asset 110 (e.g., on an external surface of the asset 110) to receive the GPS signals 130 (e.g., L1 and L2 signals). Each of the GPS signals 130 may be separately received, and may be filtered and amplified by the LNA 200. However, the LNA 200 may further be configured to sum the GPS signals 130 from each of the receive antennas 202 into a radio frequency (RF) output in the form of a combined L1-L2 signal 210. The combined signal 210 (which includes both of the GPS signals 130 still separated in frequency) may then be provided to a translator module 220. The translator module 220 may be configured to overlay and convert the combined signal 210 into a single composite signal at a different frequency (e.g., S-band). For example, the translator module 220 may be configured to overlay and downconvert the combined signal 210, generate a pilot carrier to facilitate tracking by the ground station 150, and upconvert the result as a composite signal 222 in the different frequency band (e.g., S-band).

As shown in FIG. 2, the translator module 220 may include a downconverter module 230, a power combiner module 232 and an upconverter module 234 that may operate in series with each other (in the order presented above) before the upconverter module 234 outputs the composite signal 222. The downconverter module 230, the power combiner module 232 and the upconverter module 234 may each be operably coupled to a respective instance of a frequency synthesizer 236 that is operably coupled to a frequency programming module 238 that enables each respective one of the frequency synthesizers 236 to generate a phase-coherent desired frequency output (based on input from a frequency generator 240 and the instructions from the frequency programming module 238). Thus, for example, the frequency synthesizer 236 that is associated with the downconverter module 230 may be configured to define a first local oscillator frequency (e.g., LO1) for provision to the downconverter module 230. The frequency synthesizer 236 that is associated with the power combiner module 232 may be configured to define the pilot carrier for provision to the power combiner module 232. The frequency synthesizer 236 that is associated with the upconverter module 234 may be configured to define a second local oscillator frequency (e.g., LO2) for provision to the upconverter module 234. Each of the downconverter module 230, the power combiner module 232 and the upconverter module 234 may also include a gain portion, configured to increase the gain out of the corresponding stage.

The frequency programming module 238 may therefore enable range personnel to adjust the specific frequencies to which translation of the GPS signals 130 will occur to be selected and adjustable. Moreover, the pilot carrier frequency and amplitude is also selectable so that the range personnel can manage interference mitigation or avoidance. In particular, either or both of the pilot carrier frequency and the frequencies to which the L1 and L2 signals are translated can be tailored to specific frequencies and amplitudes that avoid conflicts or increase spectral distance from other frequencies that may be used by other equipment or components that are emitting RF either on or near the range.

The composite signal 222 that is generated by the translator module 220 (which may have component frequencies selectable by the operator using the frequency programming module 238) may then be provided to a power amplifier 250. The power amplifier 250 may be configured to provide a gain boost to the composite signal 222 to provide a minimum RF output power at least 5 Watts (5 W). As such, an S-band output 252 may be provided to a hybrid combiner 260 that may feed downlink antennas 262 for provision of the S-band output 252 as the downlink transmission 160.

In an example embodiment, the MAT 120 may further include a power conditioner 270 that converts primary power provided by the host vehicle (i.e., the asset 110) to required subsystem voltages. For example, a 28V primary power source may be converted to the operating voltage required for the MAT 120. In some cases, the power conditioner 270 may be further configured to sequence the voltage in any required order, and may perform EMI/EMC filtering.

Figure 3:
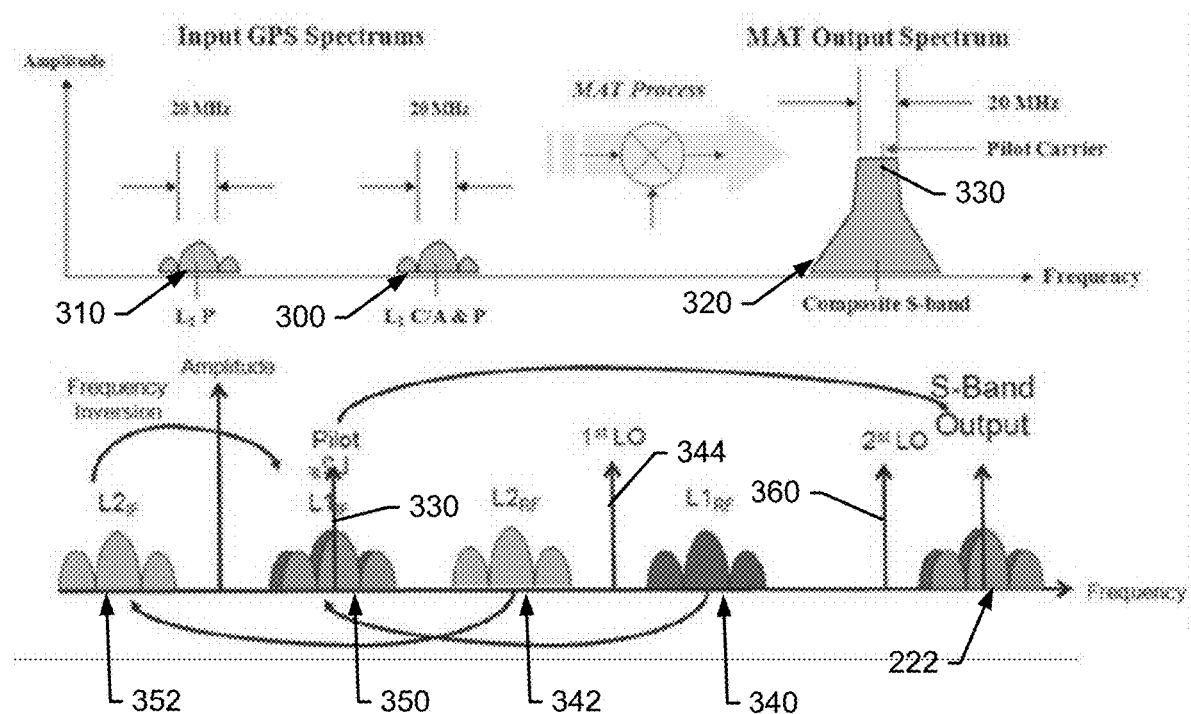
FIG. 3 illustrates an example graph of spectral outputs associated with performing the translation in accordance with an example embodiment.

FIG. 3 illustrates an example of the overlay signal translation that may be accomplished by the MAT 120 of an example embodiment. In this regard, for example, the MAT 120 may be configured to translate an L1 signal centered at 1575.42 MHz and an L2 signal centered at 1227.6 MHz to a translated L1 output signal centered at 2236.07625 MHz and a translated L2 output signal centered at 2235.80625 MHz, respectively. FIG. 3 shows an L1 input spectrum 300 and an L2 input spectrum 310 prior to processing by the MAT 120. The output spectrum 320 (of the composite signal 222 of FIG. 2) is also shown after processing by the MAT 120. As can be seen in the output spectrum 320, a pilot carrier frequency 330 may be defined (at any desirable location via the frequency programming module 238) to facilitate tracking of the asset 110. Of note, although the pilot carrier frequency 330 of FIG. 3 is selected to be within the composite S-band spectrum, the pilot carrier frequency 330 could be selected at a frequency outside the band as well. Note that the pilot carrier amplitude is adjustable as well.

FIG. 3 also illustrates operation of the translator module 220 in that FIG. 3 illustrates an L1 RF signal 340 and an L2 RF signal 342 that are then downconverted (e.g., by the downconverter module 230 of FIG. 2) in connection with LO1 344 to form an L1 intermediate frequency signal 350 and an L2 intermediate frequency signal 352 with the pilot carrier frequency 330 added by the power combiner module 232. Then, using LO2 360, the composite signal 222 is generated by the upconverter module 234.

Figure 4:
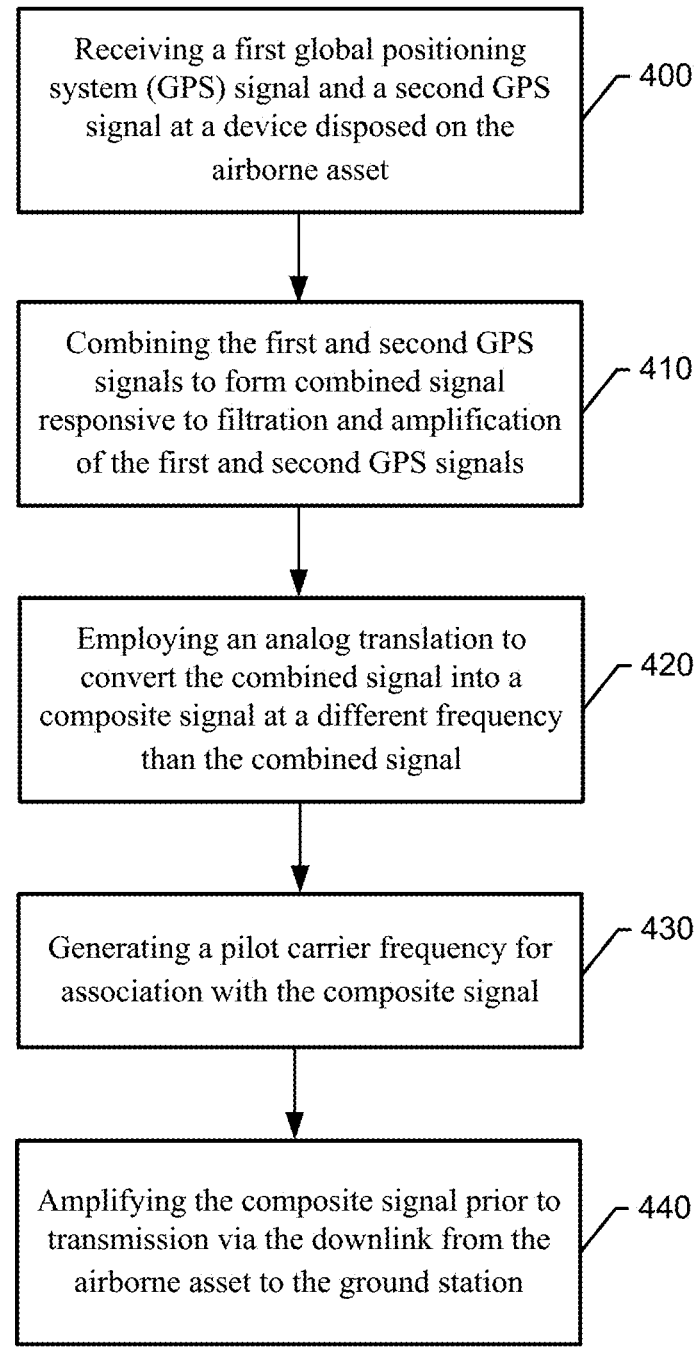
FIG. 4 illustrates a method for facilitating real time tracking of an airborne asset via downlink of GPS signals usable for determining asset location information from the asset to a ground station in accordance with an example embodiment.

FIG. 4 illustrates a block diagram of a method for facilitating provision of GPS signals usable for tracking (including possibly also real time tracking) of an airborne asset via downlink of GPS signals usable for determining location information (analog translated to a different frequency) from the asset to a ground station. The method may include receiving a first GPS signal and a second GPS signal at a device disposed on the airborne asset at operation 400 and combining the first and second GPS signals to form combined signal responsive to filtration and amplification of the first and second GPS signals at operation 410. The method may further include employing an analog translation to convert the combined signal into a composite signal at a different frequency than the combined signal at operation 420, generating a pilot carrier frequency for association with the composite signal at operation 430, and amplifying the composite signal prior to transmission via the downlink from the airborne asset to the ground station at operation 440. In accordance with example embodiments, at least the pilot carrier frequency (and in some cases also the amplitude) is adjustable to give range safety personnel the flexibility to coordinate the MAT 120 with other devices used on or near the range to mitigate interference issues. The first GPS signal (e.g., L1) may be used for real time tracking of the asset 110, while the second GPS signal (e.g., L2) may be used along with the first GPS signal for accurate post hoc processing of asset location.

In some embodiments, the features or operations described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the pilot carrier frequency may be adjustable by a frequency programming module that is further configured to enable selection of the different frequency of the composite signal and one or more intermediate frequencies employed by the translator module for performing the overlay analog translation. In an example embodiment, the different frequency of the composite signal may be an S-band signal. In some cases, employing the analog translation may include downconverting frequencies of the first GPS signal and the second GPS signal to corresponding intermediate frequencies that are lower than a frequency of the first GPS signal and the second GPS signal, respectively. In an example embodiment, the downconverting may be performed based on a first local oscillator frequency provided under control of a frequency programming module. In some cases, employing the analog translation may include employing a power combiner module configured to apply the pilot carrier frequency to the downconverted frequencies. In an example embodiment, employing the analog translation may include using a second local oscillator frequency provided under control of the frequency programming module to upconvert an output of the translator module to define the composite signal. In some cases the method may further include amplifying the composite signal by at least five Watts prior to transmission of the downlink to the ground station. In an example embodiment, the method may further include converting primary power provided by the asset into one or more voltage sources for components associated with employing the analog translation. In some cases, the first and second GPS signals may be L-band signals received from GPS satellites and the composite signal may be an S-band signal.

Example embodiments may enable real time range safety to be applied so that, for example, if the location information (and/or trajectory) of an asset indicates a problem or danger, the asset may be destroyed or redirected. This capability is provided by the translation of the GPS signals, but is further enhanced by the flexibility offered by the frequency programming module, which enables range personnel to manage the full spectrum in which wireless communications are conducted in and around the range to maximize the accuracy and effectiveness of testing conducted. The GPS L1 data received at the ground station can be converted (using GPS receiver processing techniques) to determine accurate asset location in real time. The GPS L1 and L2 data can also be used to conduct very accurate post-processing of location information to evaluate asset performance.

Although example embodiments may be useful for handling range safety issues, example embodiments could also be used for live fire situations where accurate monitoring asset location in real time (e.g., for being able to provide direction or destruction of the asset prior to impact) is desirable. The MAT 120 may include a number of individual component containers or housing units that may be stacked or otherwise collocated into a single unit that can be mounted to the asset 110. One or more instances of an antenna array (e.g., one for GPS signal receipt, and one for downlink provision) may be part of the MAT 120 or connected thereto or to the mounting structure that is affixed to the asset 110. In some cases, the MAT 120 may be provided in a housing that includes a mounting plate that is mounted to an external (or internal) surface of the asset 110. The MAT 120 may provide RF and analog technology to improve (i.e., reduce) power consumption relative to other translation options by up to 50% (e.g., MAT DC power consumption may be about 20 W). The MAT 120 may also reduce volume (e.g., by being provided in a package that is less than 20 cubic inches in volume) and weight (e.g., by weighing less than 1 pound) to have less impact on the asset 110 than other alternatives.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus configured to be disposed on an airborne asset to communicate global positioning system (GPS) signals that are usable for determining location information of the airborne asset to a ground station for tracking of the airborne asset, the apparatus comprising:
   a dual input low noise amplifier configured to receive a first GPS signal and a second GPS signal and combine the first and second GPS signals to form a combined signal;
   a translator module configured to employ analog translation to convert the combined signal into a composite signal at a different frequency than the combined signal; and
   a power amplifier configured to amplify the composite signal prior to transmission via a downlink from the airborne asset to the ground station,
   wherein the translator module is configured to generate a pilot carrier frequency to facilitate ground station tracking of the airborne asset, and wherein the pilot carrier frequency is adjustable via a frequency programming module of the translator module.

2. The apparatus of claim 1, wherein the frequency programming module is further configured to enable selection of the different frequency of the composite signal and one or more intermediate frequencies employed by the translator module for performing the analog translation.

3. The apparatus of claim 1, wherein the different frequency of the composite signal comprises an S-band signal.

4. The apparatus of claim 1, wherein the translator module comprises a downconverter module configured to downconvert frequencies of the first GPS signal and the second GPS signal to corresponding intermediate frequencies that are lower than a frequency of the first GPS signal and the second GPS signal, respectively.

5. The apparatus of claim 4, wherein the downconverter module downconverts based on a first local oscillator frequency provided under control of the frequency programming module.

6. The apparatus of claim 5, wherein the translator module further comprises a power combiner module configured to apply the pilot carrier frequency to an output of the downconverter module.

7. The apparatus of claim 6, wherein the translator module further comprises an upconverter module configured to use a second local oscillator frequency provided under control of the frequency programming module to upconvert an output of the translator module to define the composite signal.

8. The apparatus of claim 7, wherein the power amplifier is configured to amplify the composite signal to at least five Watts prior to transmission of the downlink to the ground station.

9. The apparatus of claim 1, further comprising a power conditioner configured to convert primary power provided by the airborne asset into one or more sequenced voltage sources for the low noise amplifier, the translator module and the power amplifier.

10. The apparatus of claim 1, wherein the first and second GPS signals comprise L-band signals received from GPS satellites and the composite signal comprises an S-band signal.

11. A method for facilitating real time tracking of an airborne asset via downlink of global positioning system (GPS) signals that are usable for determining asset location information from the airborne asset to a ground station, the method comprising:
  receiving a first GPS signal and a second GPS signal at a device disposed on the airborne asset;
  combining the first and second GPS signals to form a combined signal responsive to filtration and amplification of the first and second GPS signals;
  employing an analog translation to convert the combined signal into a composite signal at a different frequency than the combined signal;
  generating a pilot carrier frequency for association with the composite signal; and
  amplifying the composite signal prior to transmission via the downlink from the airborne asset to the ground station,
  wherein the pilot carrier frequency is adjustable.

12. The method of claim 11, wherein the pilot carrier frequency is adjustable by a frequency programming module that is further configured to enable selection of the different frequency of the composite signal and one or more intermediate frequencies employed by a translator module for performing the analog translation.

13. The method of claim 11, wherein the different frequency of the composite signal comprises an S-band signal.

14. The method of claim 11, wherein employing the analog translation comprises downconverting frequencies of the first GPS signal and the second GPS signal to corresponding intermediate frequencies that are lower than a frequency of the first GPS signal and the second GPS signal, respectively.

15. The method of claim 14, wherein the overlay downconverting is performed based on a first local oscillator frequency provided under control of a frequency programming module.

16. The method of claim 15, wherein employing the analog translation comprises employing a power combiner module configured to apply the pilot carrier frequency to the downconverted frequencies.

17. The method of claim 16, wherein employing the analog translation comprises using a second local oscillator frequency provided under control of the frequency programming module to upconvert an output of a translator module to define the composite signal.

18. The method of claim 17, further comprising amplifying the composite signal to at least five Watts prior to transmission of the downlink to the ground station.

19. The method of claim 11, further comprising converting primary power provided by the airborne asset into one or more sequenced voltage sources for components associated with employing the analog translation.

20. The method of claim 11, wherein the first and second GPS signals comprise L-band signals received from GPS satellites and the composite signal comprises an S-band signal.

* * * * *